(12) United States Patent
Bradley et al.

(10) Patent No.: US 10,746,951 B2
(45) Date of Patent: Aug. 18, 2020

(54) TOOL DEVICE FOR INSTALLING OPTICAL FIBERS AT USER PREMISES

(71) Applicant: OFS Fitel, LLC, Norcross, GA (US)

(72) Inventors: Kelvin B Bradley, Lawrenceville, GA (US); Denis E Burek, Cumming, GA (US); Xavier Chiron, Atlanta, GA (US); Jimmy Joy, Lawrenceville, GA (US)

(73) Assignee: OFS FITEL, LLC, Norcross, GA (US)

( * ) Notice: Subject to any disclaimer, the term of this patent is extended or adjusted under 35 U.S.C. 154(b) by 190 days.

(21) Appl. No.: 15/837,537

(22) Filed: Dec. 11, 2017

(65) Prior Publication Data

US 2018/0348465 A1 Dec. 6, 2018

Related U.S. Application Data

(60) Provisional application No. 62/550,837, filed on Aug. 28, 2017.

(51) Int. Cl.
*G02B 6/46* (2006.01)
*G02B 6/44* (2006.01)
*B65H 57/04* (2006.01)

(52) U.S. Cl.
CPC .............. *G02B 6/46* (2013.01); *B65H 57/04* (2013.01); *G02B 6/4466* (2013.01); *B65H 2701/32* (2013.01)

(58) Field of Classification Search
CPC .......... G02B 6/46; G02B 6/48; G02B 6/4439; G02B 6/4457; G02B 6/4466; H02G 3/305; B65H 49/205; B65H 57/04; B65H 57/26

USPC ........................................................... 156/71
See application file for complete search history.

(56) References Cited

U.S. PATENT DOCUMENTS

| | | | |
|---|---|---|---|
| 5,017,113 A * | 5/1991 | Heaton | B05C 17/00516 222/327 |
| 6,817,492 B1* | 11/2004 | Smith | B25B 27/023 222/309 |
| 8,906,178 B2 | 12/2014 | Burek et al. | |
| 9,835,817 B2* | 12/2017 | Burek | B65H 57/04 |
| 2009/0324188 A1 | 12/2009 | Berglund et al. | |
| 2010/0278958 A1* | 11/2010 | Chamberlain | B05C 17/00516 425/458 |
| 2013/0020015 A1 | 1/2013 | Dickinson et al. | |
| 2014/0150971 A1* | 6/2014 | Mann | G02B 6/4466 156/320 |

(Continued)

*Primary Examiner* — John L Goff, II
(74) *Attorney, Agent, or Firm* — Law Offices of Leo Zucker, Esq

(57) ABSTRACT

A tool device for installing an optical fiber inside a user premises includes a neck, a coupling joined to the neck for attachment to a leading end of an adhesive syringe or an extension pole, and a head joined to a leading portion of the neck. The head has a leading edge of a certain width, and a passageway for receiving an optical fiber and guiding the fiber to a position proximate to the leading edge. The width of the leading edge is such that when the edge is held transversely across a structural corner containing an adhesive bead, and an optical fiber is received in the passageway in the head and directed ahead of the leading edge, the edge embeds the fiber in the bead when the edge is swept along the corner with the optical fiber positioned between the edge and the adhesive bead.

9 Claims, 12 Drawing Sheets

(56) References Cited

U.S. PATENT DOCUMENTS

2016/0097911 A1 4/2016 George et al.
2017/0160508 A1 6/2017 Burek et al.

* cited by examiner

TOOL DEVICE FOR INSTALLING OPTICAL FIBERS AT USER PREMISES

CROSS REFERENCE TO RELATED APPLICATIONS

This application claims priority under 35 U.S.C. § 119(e) of United States Provisional Patent Applications No. 62/550,837 filed Aug. 28, 2017, titled "Cord Guide Tools," the entire contents of which are incorporated herein by reference.

BACKGROUND OF THE INVENTION

Field of the Invention

The present invention relates to tools for installing optical fibers or cables at user premises, particularly when the installations involve bonding the fibers to a structural surface along a determined routing path at the premises.

Discussion of the Known Art

Desktop optical network terminals (ONTs) are increasingly being deployed inside the premises of fiber optic network users. As used herein, the term "premises" refers to a living unit, e.g., a home, office, or apartment, within which a user of a fiber optic network resides and uses services offered by the network, e.g., Internet access, telephony, television, voice and music broadcasts, and/or other information and data streams that require the routing and installation of one or more optical fibers inside the premises.

Further, the term "optical fiber" is used broadly in the present specification and claims to mean an optical fiber that is buffered and/or jacketed, as well as a fiber optic cable that contains one or more optical fibers.

ONTs are typically located near a TV set top box, an Internet modem, or other device to which the ONT is connected at the premises. A need therefore exists for a procedure and tools for routing an optical fiber between an ONT inside a premises, and a network access module typically located at or near an entry point of the premises. Ideally, the fiber should be routed quickly without damaging the fiber, securely, and with little if any adverse visual impact when the installation is complete.

The use of conventional staples to secure an optical fiber to a wall, a molding, or other accessible structural surface at the premises may reduce installation time and incur relatively low cost. Stapled installations, however, are rejected by many users who opt instead for special moldings or conduits to conceal the fiber. Staples can also physically damage walls and moldings, and impair or break an optical fiber if they are not driven carefully. Moreover, many users prefer to keep all wires and optical fibers inside their premises completely hidden, thus requiring expensive hardware and additional installation time.

Accordingly, a system that enables an installer to route and permanently bond an optical fiber or cable easily, quickly, correctly, and safely along exposed structural surfaces, grooves, and/or corners inside a premises with minimal visibility is very desirable. A solution offered by OFS Fitel, LLC under the registered mark InvisiLight® fulfills this need by enabling fast, easy, and virtually invisible fiber installations using a consumer-grade, low-odor, nonhazardous, water-based adhesive that bonds buffered and jacketed optical fibers to walls and ceilings indoors. Water-based adhesives are desirable since they are typically non-toxic, allow clean up with soap and water, and can be shipped worldwide without restriction. As the demand for InvisiLight installations has spread, users have expressed a desire that the installation time be reduced even more by addressing the following concerns.

The current procedure requires an installer to move and climb a ladder multiple times. First, the adhesive is applied by the installer over elevated portions of the routing path in succession by repositioning and climbing the ladder to reach the ceiling or molding at each portion of the path, while holding a conventional adhesive dispensing gun equipped with a reloadable adhesive syringe having a nozzle. To apply the adhesive, the installer squeezes the gun trigger one or more times to cause a plunger inside the syringe to urge the adhesive out of the syringe nozzle. Once the adhesive is applied over the entire routing path, the installer then repeats the first series of ladder movements, climbing the ladder again at each elevated portion of the routing path whereat the installer presses the fiber manually into the adhesive. At many premises, however, it is difficult for the installer to position the ladder safely next to large furniture (e.g., sofas and entertainment centers) that happen to be situated directly beneath the routing path.

U.S. patent application Ser. No. 15/790,317 filed Oct. 23, 2017, which issued as U.S. Pat. No. 10,259,006 (Apr. 16, 2019)) and is assigned to the present applicant, discloses an extensible adhesive gun dispensing system that can extend the reach of a conventional adhesive dispensing gun by two or more feet, thus enabling an installer to apply an adhesive bead along elevated portions of a fiber routing path without having to set up and climb a ladder below each portion. As shown in FIG. 1 of the present application, the system 100 in the '317 application includes a syringe 12 for containing the adhesive. The syringe 12 has a dispensing nozzle 14, an internal piston for urging the adhesive out of the nozzle, and a mount 18 at the back of the syringe. A conventional adhesive dispensing gun 10 has a corresponding mount 30 at the front of the gun, a trigger 24, and an elongated plunger 26 that advances out of the front of the gun each time the trigger is pulled.

The system 100 also includes an elongated extension tube 112 with a mount 120 at one end for engaging the mount 30 on the gun 10, and another mount 124 at the other end for engaging the mount 18 on the syringe 12. A rod member is arranged for axial movement inside the tube 112, and a plunger head is fixed on a front end of the rod member. Each time the gun trigger 24 is pulled, the gun plunger 26 contacts and urges the rod member inside the tube 112 forward, whereby the plunger head on the rod member engages and forces the piston inside the syringe 12 to urge the adhesive out of the syringe nozzle 14. Thus, using the system 100, an installer can apply an adhesive bead over all elevated portions of a fiber routing path at a given premises while standing on the floor.

U.S. Patent Application Pub. No. 2017/0160508 (Jun. 8, 2017), which issued as U.S. Pat. No. 9,835,817 (Dec. 5, 2017) and is also assigned to the present applicant, describes a tool for embedding an optical fiber in an adhesive bead that has been applied along an elevated routing path in a building room or hallway. The tool has a neck that can be attached to the far end of an extension pole such as those used with paint rollers, window squeegees, and the like. The tool also has a trough for receiving an optical fiber to be embedded in the adhesive bead, a guide channel at an end of the trough for retaining the fiber, and a nose at a downstream end of the channel. The tool nose is configured so that when swept over the adhesive bead, the fiber enters the nose from the guide channel and becomes embedded in the bead.

U.S. Pat. No. 8,906,178 (Dec. 9, 2014) also discloses a tool for installing an optical fiber at customer premises. The fiber is pre-coated with an adhesive that becomes activated as the fiber is unwound from a supply spool and guided through a chamber containing an activating substance. The fiber with the activated adhesive coating is then applied by an applicator wheel over a defined routing path along an exposed surface at the premises. When the activated adhesive coating hardens, the fiber becomes bonded to the surface along which it was applied. The supply spool, the chamber, and the applicator wheel are all mounted on the tool body.

SUMMARY OF THE INVENTION

According to the invention, a tool device for installing an optical fiber inside a user premises includes a neck, a coupling joined to the neck for attachment to a leading end of an adhesive syringe or an extension pole, and a head joined to a leading portion of the neck. The head has a leading edge of a certain width, and a passageway for receiving an optical fiber and guiding the fiber to a position proximate to the leading edge.

The width of the leading edge on the head of the device is determined so that when the edge is held transversely across a structural corner in which an adhesive bead is deposited, and an optical fiber is received in the passageway in the head and directed ahead of the leading edge, the edge embeds the fiber in the adhesive bead when the edge is swept along the corner with the optical fiber positioned between the edge and the adhesive bead.

According to another aspect of the invention, a tool system for installing an optical fiber inside a user premises includes a tool device having a neck, and a head joined to a leading portion of the neck wherein the head has a leading edge of a certain width. The tool system also has an adhesive dispensing gun system including a syringe for applying an adhesive bead along a structural corner inside a user premises. A coupling is joined to the neck of the tool device for attachment to the syringe.

The width of the leading edge on the head of the tool device is determined so that when the edge is held transversely across the structural corner in which the adhesive bead is applied, and an optical fiber is received in the passageway in the head and directed ahead of the leading edge, the edge embeds the fiber in the adhesive bead when the edge is swept along the corner with the optical fiber positioned between the edge and the adhesive bead.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
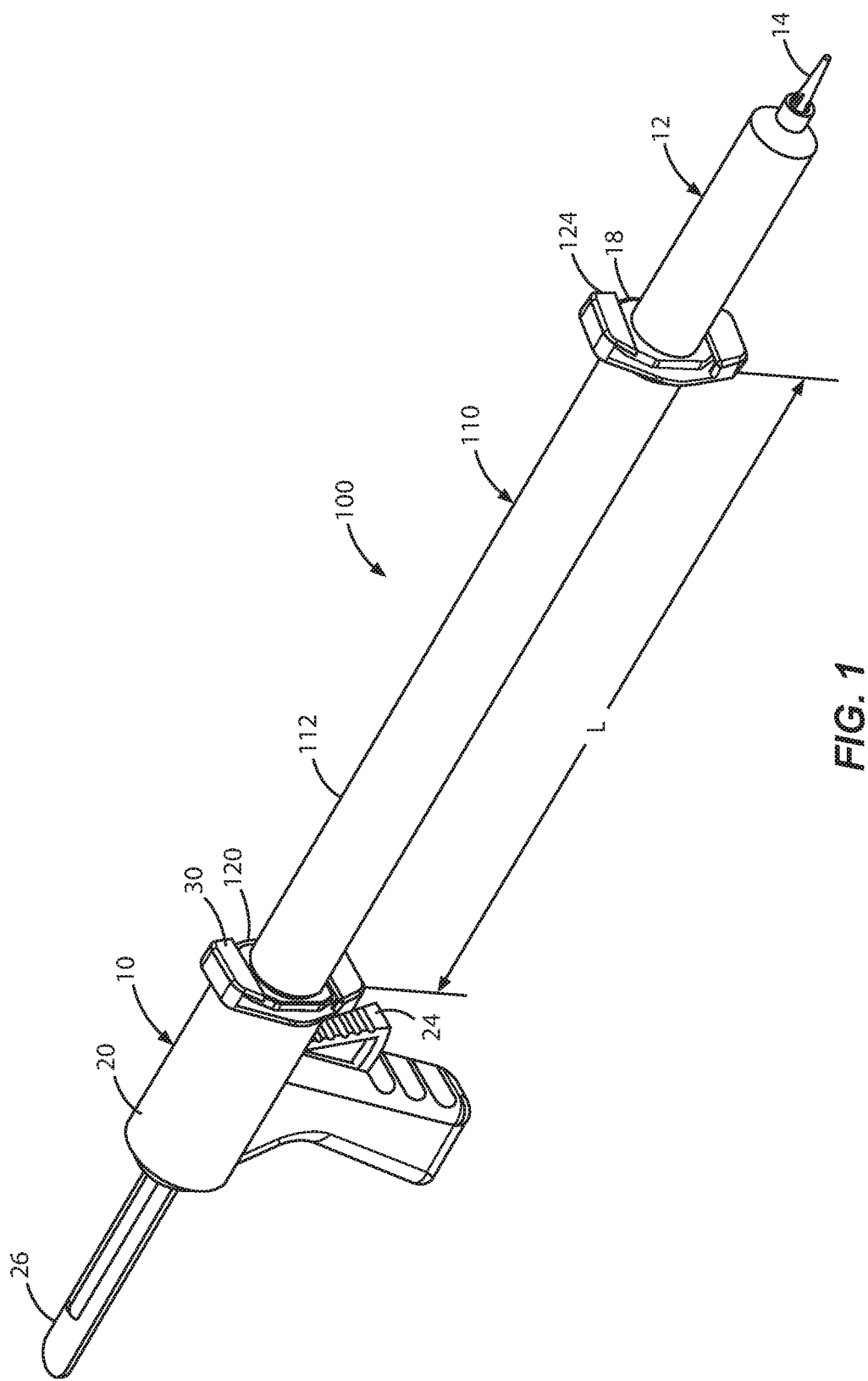
FIG. 1 shows an extensible adhesive dispensing gun system to which the inventive tool device can be attached when installing an optical fiber at a user premises.

The inventive tool device enables an installer to embed an optical fiber into an adhesive bead that has been deposited along a defined routing path at a given user premises, without having to climb and reposition a ladder multiple times at locations where the routing path is at or near the ceiling. Additionally, the tool device can be used in conjunction with the adhesive dispensing gun system 100 in FIG. 1 after the system 100 applies the adhesive bead, thus eliminating the need for a separate extension pole.

Figure 2A:
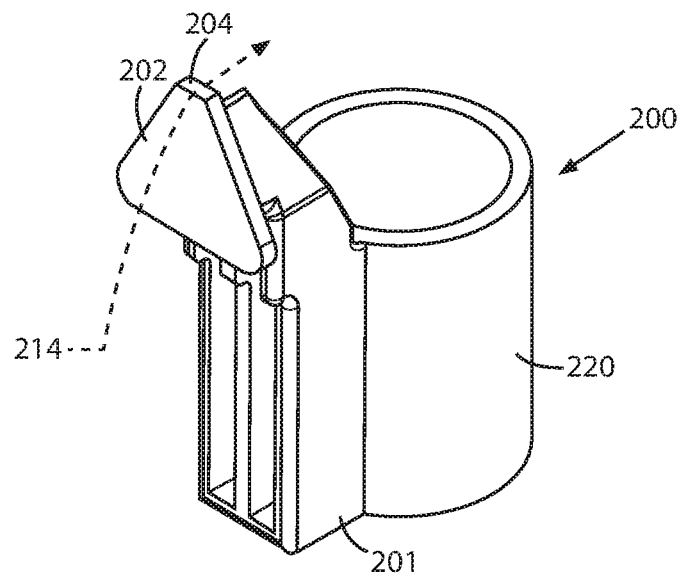
FIGS. 2A and 2B are isometric views of a first embodiment of the inventive tool device.
Figure 2B:
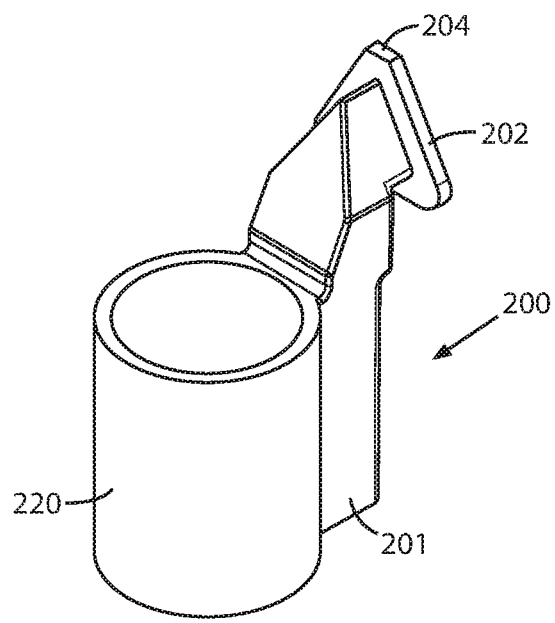

FIGS. 2A and 2B are front and rear isometric views of a tool device 200 according to a first embodiment of the invention. The device 200 has a neck 201 and a flat head 202 joined to a leading portion of the neck 201. The head 202 is shaped generally in the form of an equilateral triangle, an upper vertex of which is cut back to form a straight leading edge 204. It will be understood that the head 202 may be generally shaped other than triangular, e.g., polygonal, circular, or freeform, provided the leading edge 204 is present and functions as described below. The entire device 200 can be made of a plastics or rubber material that is molded, machined, or 3D-printed. Suitable materials include, for example and without limitation, nylon 6, ABS, polypropylene, polyethylene, PTFE, and polyurethane, all of which are chemical and water-resistant.

Figure 3:
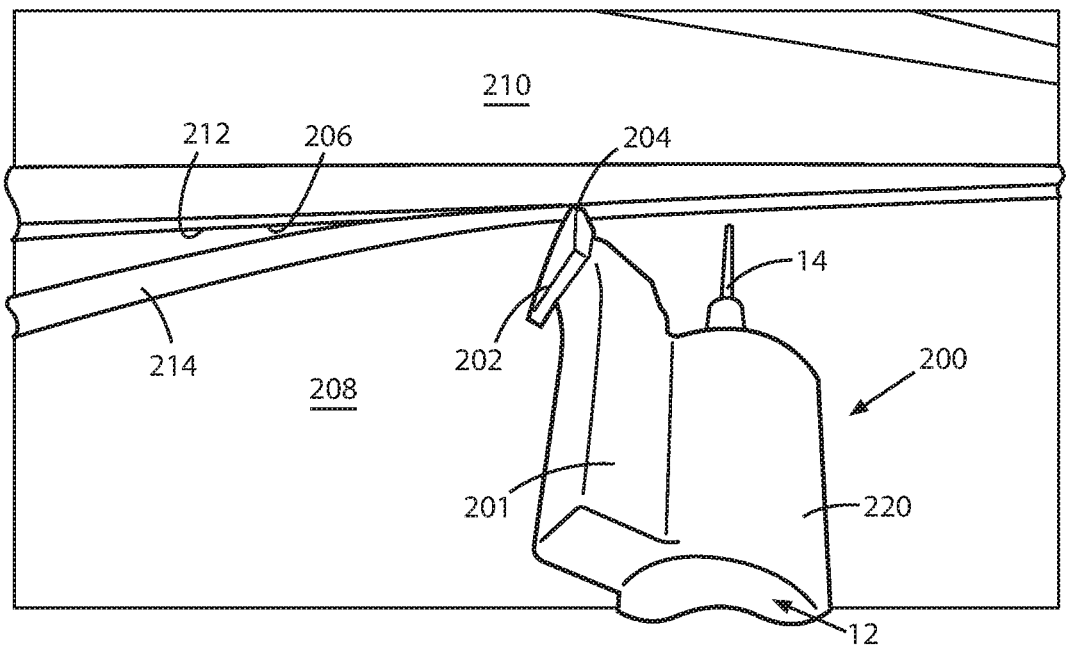
FIG. 3 shows the tool device of FIGS. 2A & 2B in use after attachment to a far end the dispensing gun system in FIG. 1.

The leading edge 204 of the tool device 200 is dimensioned and configured so that when the edge is swept along a structural corner 206 formed by, e.g., a wall 208 and a crown molding 210 (see FIG. 3), two adjacent walls, or a wall and a ceiling, and an adhesive bead 212 has been dispensed along the corner 206, the area between the edge 204 and the corner 206 is sufficiently confined so that when an optical fiber 214 is guided between the edge 204 and the corner 206 as shown in FIGS. 2A and 3, the fiber 214 is firmly embedded in the adhesive bead 212. In addition, as the leading edge 204 embeds the fiber 214 in the bead 212, any excess adhesive is forced outside the confined area and deposited on the facing surface of the device head 202 beneath the edge 204. As a result, only a neat and even strip of the adhesive 212 remains visible along the corner 206.

Figure 4:
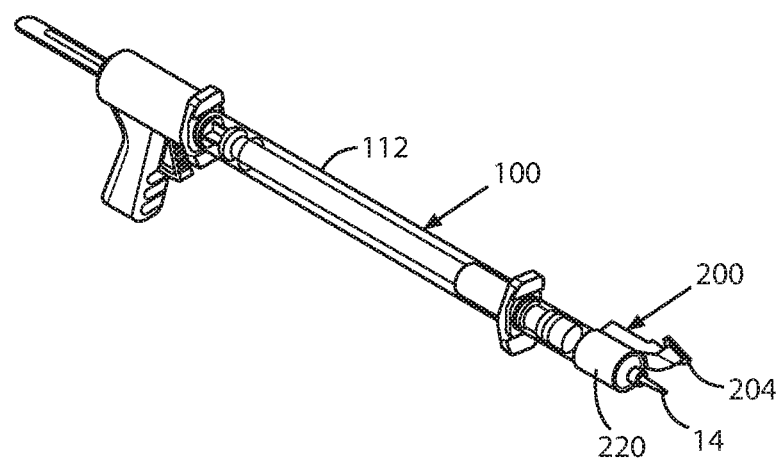
FIG. 4 shows the dispensing gun system in FIG. 1 with the inventive tool device attached at the far end of the system.

The tool device 200 also features an attachment coupling 220 that is joined to a trailing portion of the neck 201. The coupling 220 may be in the form of a cylindrical collar as shown, wherein the inner diameter of the collar is set to obtain a tight fit over the leading end of the syringe 12 of the adhesive dispensing system 100. See FIGS. 3 and 4. Thus, while standing on the floor, an installer can use the dispensing system 100 to deposit the adhesive bead 212 along one or more elevated structural corners 206. When done, the installer simply slides the attachment coupling 220 of the tool device 200 onto the leading end of the syringe 12, and uses the extension tube 112 of the system 100 instead of a separate pole to sweep the edge 204 on the tool device along the corner 206 while guiding the fiber 214 between the edge 204 and the adhesive bead 212.

For those portions of the fiber routing path that can be reached by the installer without a ladder, the adhesive bead 212 can be applied with the syringe 12 mounted directly to the adhesive dispensing gun 10 of the system 100. The fiber 214 can then be embedded in the adhesive bead 212 by fitting the attachment coupling 220 of the tool device 200 on the leading end of the syringe 12 as above, and using the dispensing gun 10 as a handle to sweep the edge 204 on the tool device along the corner 206 while the fiber 214 is guided between the edge 204 and the bead 212.

For fibers having outside diameters ranging from 0.9 to 2.3 mm, the width of the leading edge 204 of the tool device 200 can be approximately 4.45 mm. For fibers having outside diameters ranging from 2.4 to 3.5 mm, the leading edge 204 on the tool device 200 can be approximately 6.0 mm. It will be understood that the width of the edge 204 can be increased or decreased to ensure that fibers whose outside diameters are greater or smaller will be firmly embedded in the adhesive bead 212 by the edge 204.

As mentioned, a water-based adhesive is preferably used to bond the fiber 214 to wall and ceiling surfaces inside a user premises. The adhesive is dispensed in the form of the bead 212 along the corner 206 in FIG. 3, using the adhesive dispensing gun 10 in FIG. 1 and the reloadable adhesive syringe 12 with tapered nozzle 14, with or without the extension tube 112. The size of the dispensed adhesive bead 212 is dependent on the nozzle size, the speed at which the installer moves the nozzle 14 along the corner 206, and how frequently the trigger 24 of the gun 10 is pulled. To avoid excessive adhesive application, different nozzle sizes can be used depending on the diameter of the optical fiber to be installed.

For example, for fibers having diameters of 0.9 mm and 1.2 mm, the I.D. of the outlet of nozzle 14 is preferably about 0.84 mm (i.e., 18 gauge). In this case, the installer should attempt to dispense the bead 212 with an approximately 1 mm diameter. When fibers having diameters of 2.0 mm and 2.3 mm are installed, the I.D. of the nozzle outlet should be about 1.6 mm (i.e. 14 gauge), and the dispensed bead should have a diameter of less than 2 mm. The different nozzles 14 can be color coded to allow the installer to identify the correct size quickly.

Figure 5A:
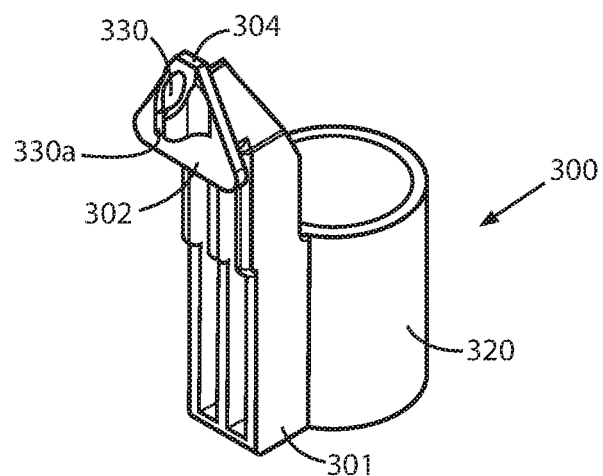
FIGS. 5A and 5B are isometric views of a second embodiment of the inventive tool device.
Figure 5B:
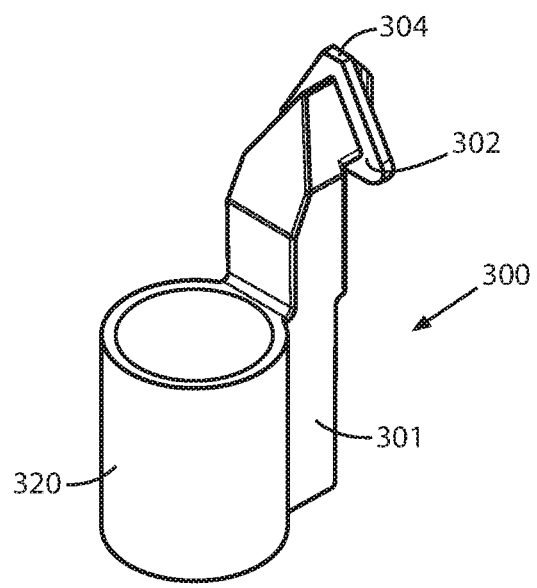

The adhesive should dry within one to three hours depending on the size of the dispensed bead 212. Excessive adhesive application can adversely affect the drying time. From a customer-satisfaction perspective, the installed fiber should exhibit minimal if any visibility as soon as possible after the installation. It typically takes 24 hours for the adhesive to cure fully, but the cure time is dependent on temperature, humidity, as well as the thickness of dispensed adhesive bead 212. It is therefore important that the adhesive dispensing process be carried out in a manner that does not inadvertently increase the time for the adhesive to cure A tool device 300 according to another embodiment of the invention is shown in FIGS. 5A and 5B. Parts of the device 300 that are the same or similar to those of the tool device 200 in FIGS. 2A and 2B have the same reference numerals increased by 100. A fiber passageway 330 is formed along the head 302 of the device 300, adjacent to the leading edge 304. The passageway 330 is dimensioned and configured to receive a fiber, and to guide the fiber ahead of the leading edge 304 on the device 300 so that the fiber is disposed between the edge 304 and an adhesive bead deposited in a structural corner as the edge 304 is swept along the corner. The passageway 330 can be cylindrical, polygonal, or freeform, provided it is sized so that the fiber can pass freely in the axial direction through the passageway.

As seen in FIG. 5A, a longitudinal slot 330a is formed in the wall of the passageway 330 so that the fiber can be inserted or urged sideways to enter the passageway. The width of the slot 330a may be such as to allow the fiber to pass freely sideways through the slot to enter the passageway 330, or such that the fiber must be slightly compressed radially in order to pass sideways through the slot 330a. For example, for a fiber having an O.D. of 2.0 mm, the width of the slot 330a should be 2.0 mm or slightly less.

If the fiber needs to be forced sideways through the slot 330a, then it will be captured in the passageway 330 once it fully enters the passageway, and the fiber will remain captured in the passageway while the tool device 300 is being used. To separate the fiber 314 from the tool device 300, the installer gently applies just enough force to pull the fiber sideways back through the slot 330a. The inside diameter of the passageway 330 should also at least be sufficient to allow a cotton swab to be inserted to remove any excess adhesive that accumulated inside the passageway 330 after using the tool device 300.

Figure 6A:
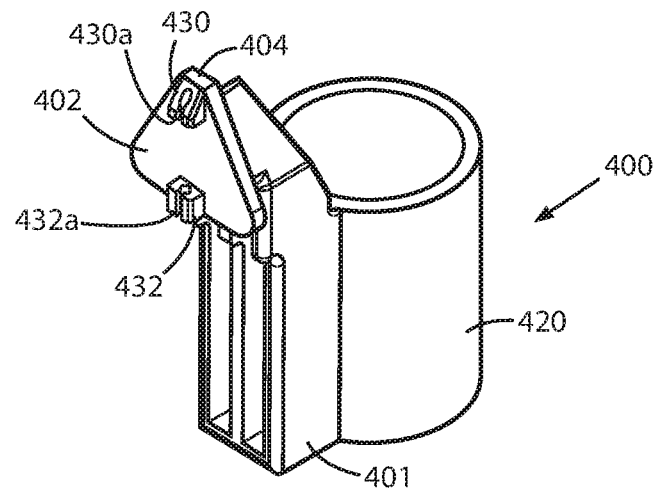
FIGS. 6A and 6B are isometric views of a third embodiment of the inventive tool device.
Figure 6B:
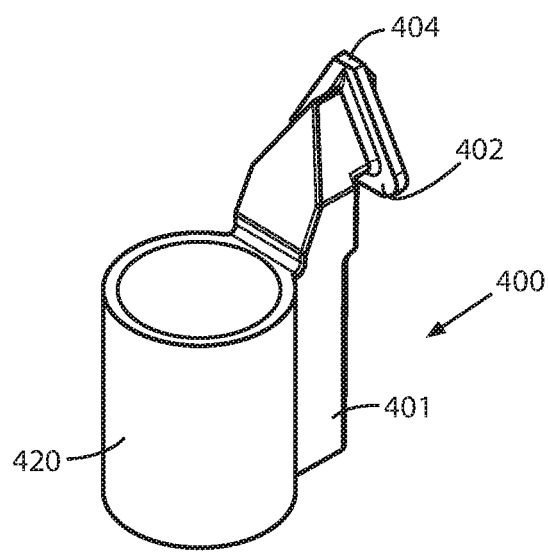

A tool device 400 according to a further embodiment of the invention is shown in FIGS. 6A and 6B. Parts of the device 400 that are the same or similar to those of the tool device 200 in FIGS. 2A and 2B have the same reference numerals increased by 200. Upper and lower passageway sections 430, 432 are formed in axial alignment with one another on the head 402 of the device, wherein each of the sections 430, 432 has a slot 430a, 432a in its wall. Depending on the width of the slots 430a, 430b and the O.D. of the fiber, the fiber can be received inside the passageway sections 430, 432 by inserting or urging it sideways through the slots 430a, 432a, either freely or with minimal force as described above. By separating the upper and lower passageway sections 430, 432 from one another, any excess adhesive that accumulates on the surface of the head 402 of the tool device 400 while the device is used can be removed more easily and thoroughly.

Figure 7A:
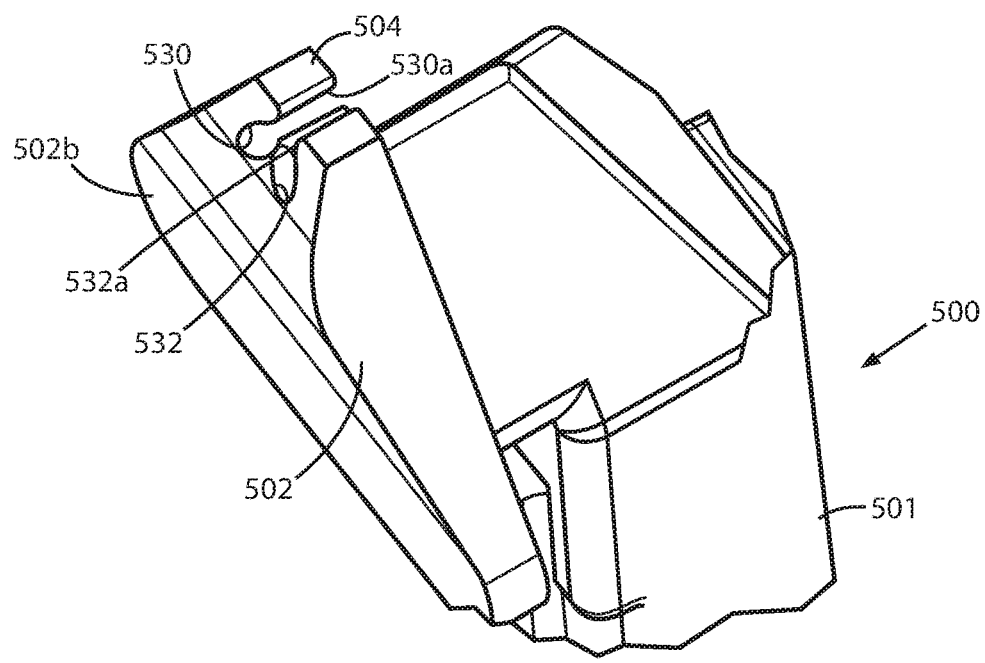
FIGS. 7A and 7B are partial isometric views of a fourth embodiment of the inventive tool device.
Figure 7B:
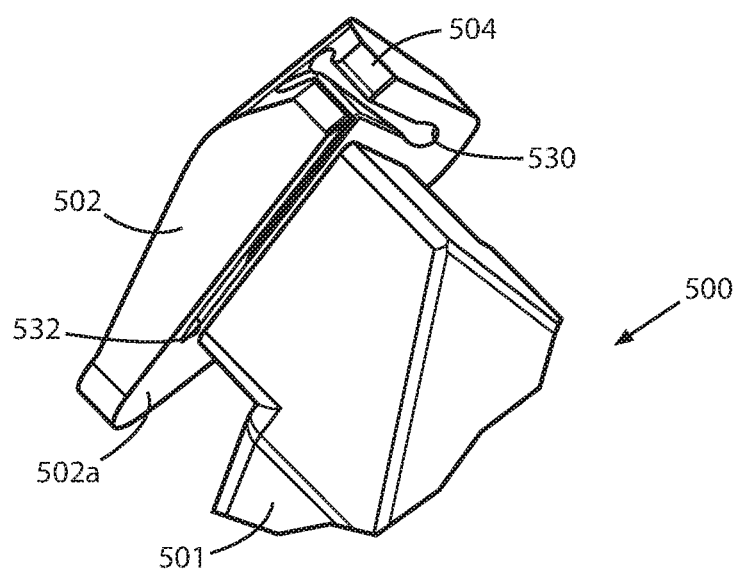

A tool device 500 according to a further embodiment of the invention is shown in FIGS. 7A and 7B. Parts of the device 500 that are the same or similar to those of the tool device 200 in FIGS. 2A and 2B have the same reference numerals increased by 300. Separate fiber channels or passages 530, 532 are formed within the head 502 of the device 500. Each one of the passages opens onto a rear side 502a of the head 502 at either the left or the right side of the device neck 501, and onto a front side 502b of the head 502 at a position proximate to the leading edge 504. The passages 530, 532 have associated slots 530a, 532a that extend radially of the passages and which are open continuously on the outside surface of the head 502.

The width of the slots 530a, 532a is such that a given fiber can be passed sideways with minimal force through either slot, and become captured or confined within the corresponding passage. Once captured in either passage, the fiber is guided in direction from the rear side 502a of the head to a position on the front side 502b of the head that is proximate to the leading edge 504. It will therefore be understood that the separate passages 530, 532 enable the device 500 to sweep the leading edge 504 from either left-to-right, or from right-to-left, in order to embed the fiber in an adhesive bead along a structural corner at a given premises.

Figure 8A:
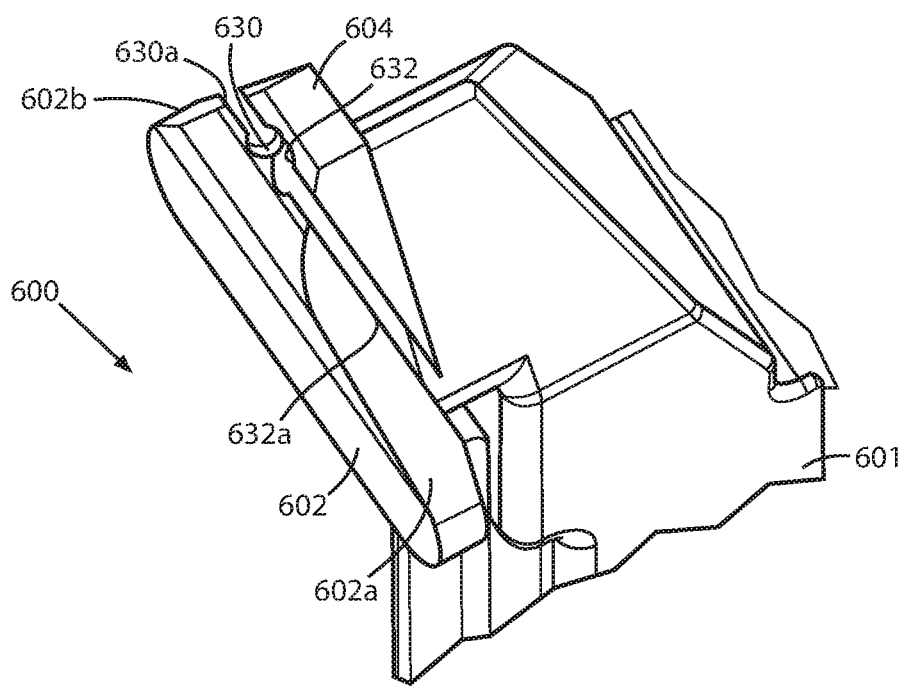
FIGS. 8A and 8B are partial isometric views of a fifth embodiment of the inventive tool device.
Figure 8B:
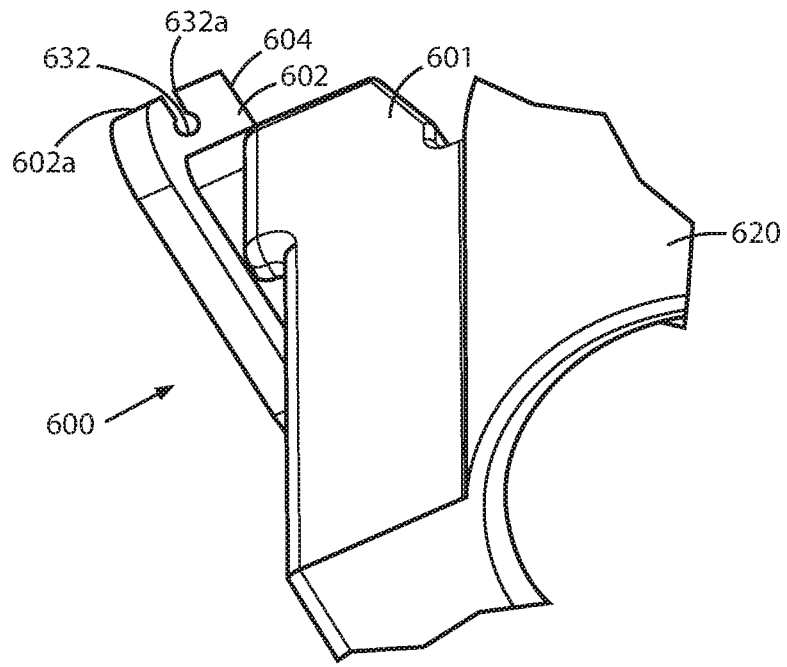

FIGS. 8A and 8B show a tool device 600 according to a further embodiment of the invention. Parts of the device 600 that are the same or similar to those of the tool device 200 in FIGS. 2A and 2B have the same reference numerals increased by 400. In the tool device 600, separate fiber channels or passages 630, 632 are formed within the head 602 of the device 600. One end of passage 632 opens onto a right rear side 602a of the head 602 when viewing the device 600 from the front, and one end of the passage 630 opens onto a left rear side 602b of the head. The opposite ends of the passages open at positions that are proximate to the leading edge 604. The passages 630, 632 have associated slots 630a, 632a that extend radially of the passages and which are open continuously on the outside surface of the head 602.

The width of the slots 630a, 632a is such that a given fiber can be passed sideways with minimal force through either slot, and become captured or confined within the corresponding passage. Once captured in either passage, the fiber is guided in direction from a corresponding side of the neck 601 of the device 600, to a position on the front of the head 602 that is proximate to the leading edge 604. It will therefore be understood that the separate passages 630, 632 enable the device 600 to sweep the leading edge 604 from either left-to-right, or from right-to-left, in order to embed the fiber in an adhesive bead along a structural corner at a given premises.

Figure 9A:
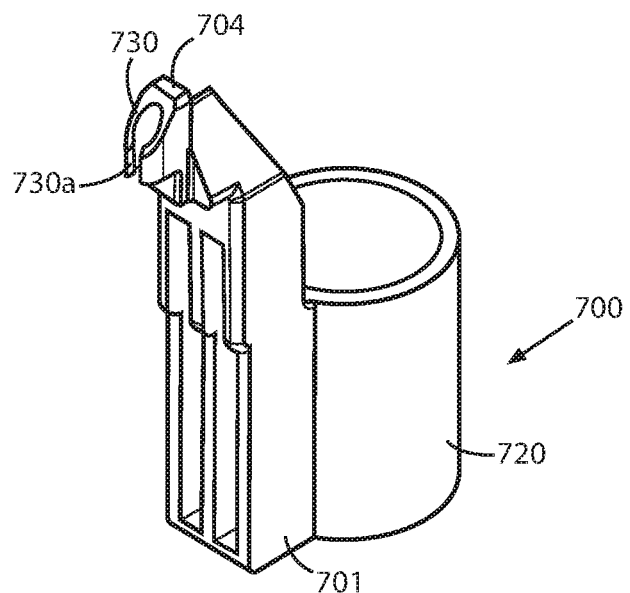
FIGS. 9A and 9B are isometric views of a sixth embodiment of the inventive tool device.
Figure 9B:
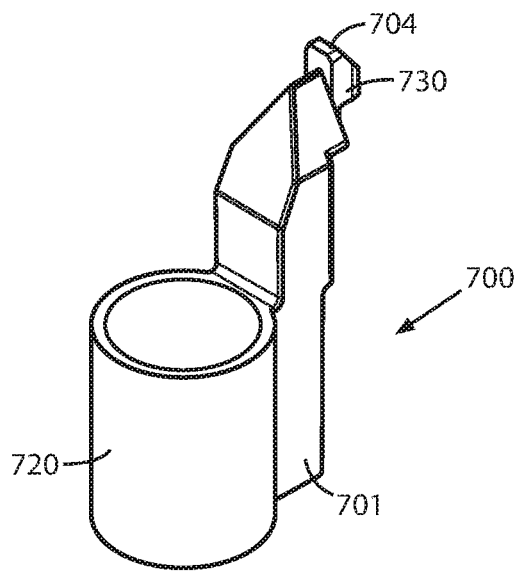

A tool device 700 according to yet another embodiment of the invention is shown in FIGS. 9A and 9B. Parts of the device 700 that are the same or similar to those of the tool device 200 in FIGS. 2A and 2B have the same reference numerals increased by 500. The tool device 700 may be regarded as a streamlined, low-profile version of the tool device 200 in FIGS. 5A and 5B. In this embodiment, the generally triangular head 202 of the device 200 is substantially eliminated, leaving only a cylindrical passageway 730 formed on a leading portion of the neck 701 of the tool device 700, wherein the passageway 730 has a longitudinal slot 730a in its wall.

It has been found that when one of the surfaces forming a structural corner is not completely smooth and an adhesive bead has been deposited in the corner, the inventive tool device slides more easily along the bead when the head 202 of the device 200 in FIGS. 2A and 2B is scaled back or eliminated. Accordingly, the tool device 700 in FIGS. 9A and 9B fits and glides more easily along non-smooth corners between rough surfaces like, for example, popcorn ceilings and textured walls.

As mentioned, the width of the slot 730a in the wall of the passageway 730 can be set so that an optical fiber passes freely sideways through the slot 730a, or must be slightly forced (i.e., the fiber jacket slightly compressed) to pass through the slot 730a. For example, for a fiber having an O.D. of 2.0 mm, the width of the slot 730a should be 2.0 mm or less. If the fiber needs to be slightly forced to pass through the slot 730a, it will stay captured within the passageway 730 while the tool device 700 is being used. To remove the fiber from the passageway 730, the installer gently applies just enough force to pull the fiber sideways back through the slot 730a. The inside diameter of the passageway 730 should at least be sufficient to allow a cotton swab to be inserted to remove any excess adhesive that has accumulated inside the passageway 730 after the tool device 700 is used.

Figure 10:
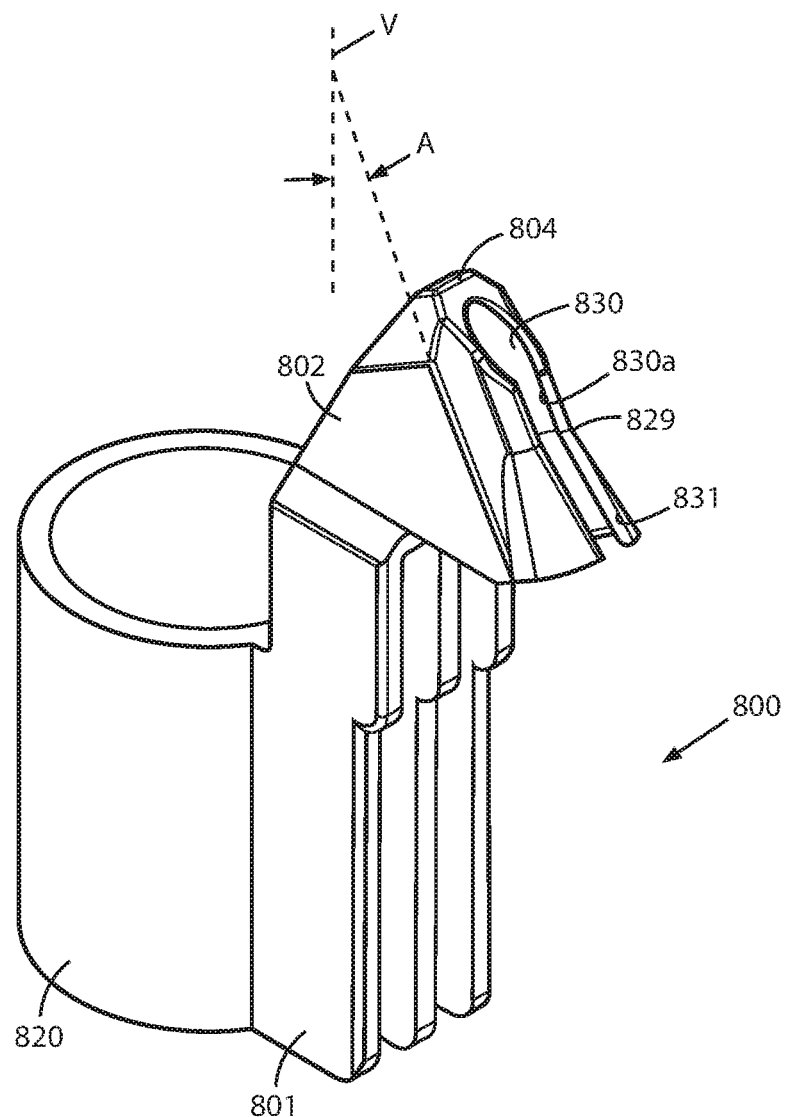
FIG. 10 is an isometric view of a seventh embodiment of the inventive tool device.

Another low-profile tool device 800 according to the invention is shown in FIG. 10. Parts of the device 800 that are the same or similar to those of the tool device 200 in FIGS. 2A and 2B have the same reference numerals increased by 600. The fiber passageway 830 in the device 800 has a guide portion 831 that tapers radially outward from an inlet 829 of the passageway 830. The guide portion 831 thus facilitates receiving an end of an optical fiber, and guiding the fiber directly into the passageway inlet 829. Also, by integrating the guide portion 831 with the passageway 830 instead of providing a separate guide ring or collar 833 as in FIG. 12, the tool device 800 is easier to mold.

In general, to improve the ease of use of the disclosed tool devices, the plane of the heads of the devices on which the fiber passageways are formed may be tilted by 20 to 70 degrees from vertical V. For example, the head 802 of the low-profile tool device 800 in FIG. 10 is tilted by A=30 degrees from the vertical V. As a result, the angle at which an installer needs to tilt the extension tube 112, or a pole or other device to which the coupling 820 of the tool device 800 is attached, is reduced when using the device 800 to embed an optical fiber in the adhesive bead.

To improve the performance of the disclosed tool devices when used on stippled, popcorn, or textured surfaces, the head of the device can be made as a separable molded rubber piece, or as an integrated (i.e., over-molded or insert-molded) piece. Any suitable chemical and water resistant rubber material can be used. The durometer of the molded rubber part would typically range from 40 to 95, Shore A. The molded rubber head will have sufficient compliance to allow it to move readily over textured surfaces, while conforming to the surface irregularities enough to guide and embed optical fibers in place.

Figure 11A:
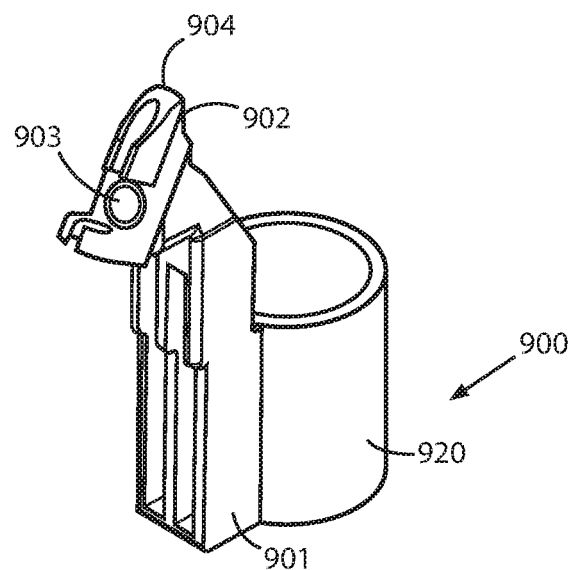
FIGS. 11A and 11B are isometric views of an eighth embodiment of the inventive tool device.
Figure 11B:
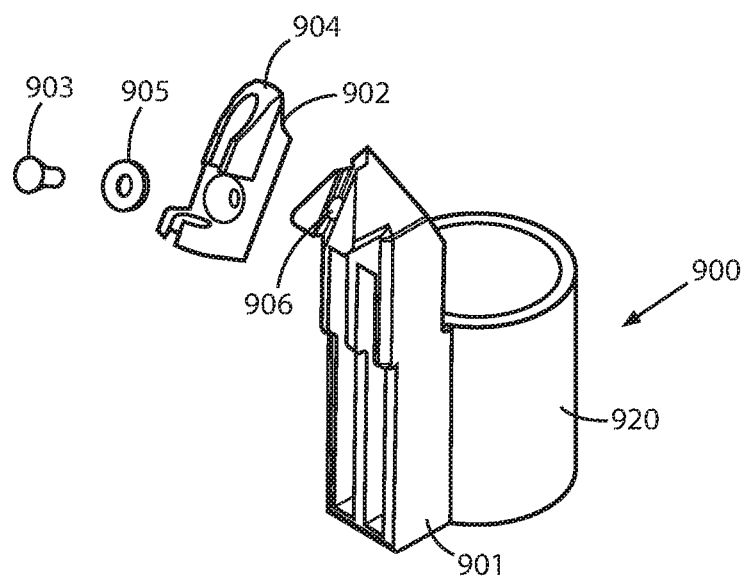

FIGS. 11A and 11B show an example of a tool device 900 according to the invention, including a separable rubber head 902. Parts of the device 900 that are the same or similar to those of the tool device 200 in FIGS. 2A and 2B, have the same reference numerals increased by 700. In the device 900, the rubber head 902 is attached to the leading portion of the device neck 901 via a machine screw 903, a washer 905, and a threaded insert 906 that is press fit into the leading portion of the neck 901. It will be understood, however, that the rubber head 902 can be attached to the leading portion of the neck 901 via snap latches, slip-fit features, or other suitable mechanical means.

Figure 12:
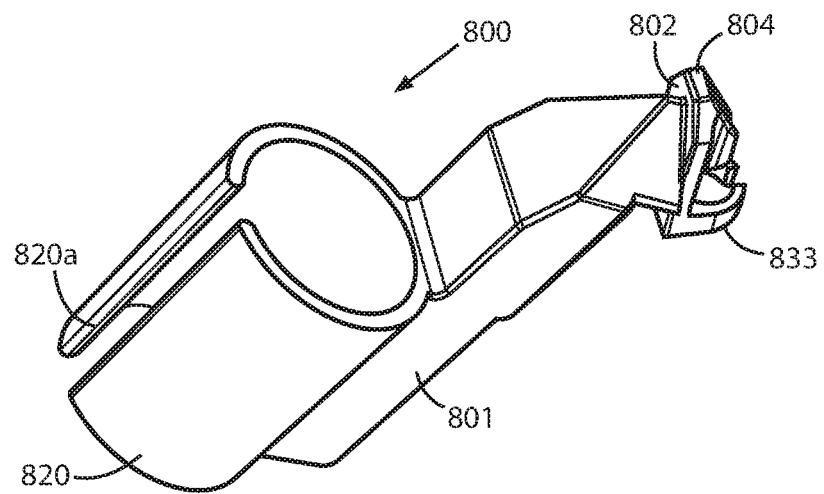
FIG. 12 is an isometric view of the inventive tool device with a slot formed in an attachment coupling of the device.

Another option is illustrated in FIG. 12, wherein a longitudinal slot 820a is formed in the wall of the attachment coupling 820 of the illustrated tool device 800. Such slots may be formed in the attachment couplings of any the disclosed embodiments of the inventive tool device in order to improve the gripping force applied by the coupling about the leading end of the syringe 12 of the dispensing gun system 100, or a conventional extension pole. If a longitudinal slot is formed in the attachment coupling, the inside diameter of the coupling should be such as to optimize the gripping force in view of the elasticity of the material forming the coupling.

Moreover, as a further option, the inventive tool device may include a fiber supply spool fixture 1000. See FIGS. 13 and 14, wherein the fixture 1000 is fastened to the attachment coupling 820 on one side of the tool device 800. The fixture 1000 may be located at any other convenient position on the front or side of the tool device, and it can be made as a separable part or molded integrally with the rest of the tool device.

Figure 13:
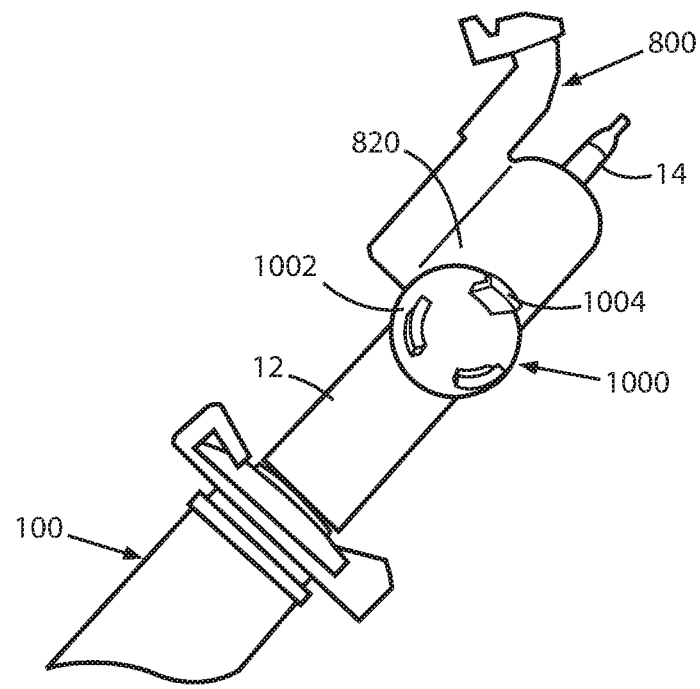
FIGS. 13 and 14 show a fiber supply spool fixture attached to the inventive tool device.
Figure 14:
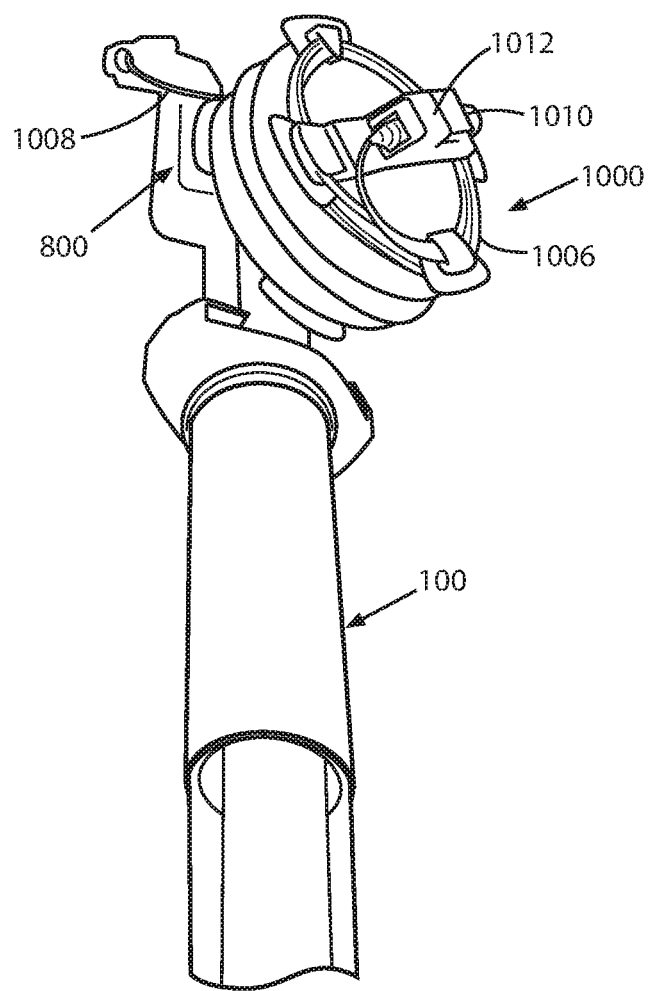

In FIG. 13, the fiber supply spool fixture 1000 is attached to a side of the tool device 800 using, e.g., mating hook and loop or Velcro® materials. The fixture 1000 includes a base plate 1002 from which a number of latching fingers 1004 extend over a circular arc to engage and retain the hub of a fiber supply spool 1006. While the tool device 800 is being used as shown in FIG. 14, an optical fiber 1008 can be paid out from the spool 1006 to enter the passageway in the device, and be embedded in an adhesive bead by the leading edge of the device. Note that the end of the fiber 1008 wound on the spool 1006 may be pre-terminated in an optical connector 1010 that is stored in a spool-mounted retainer 1012.

As described herein, the inventive tool device operates to guide an optical fiber ahead of a leading edge on the device which, in turn, embeds the fiber in an adhesive bead deposited along structural corners at a user premises including corners that are elevated and would otherwise require a ladder to reach. Excess adhesive is accumulated and removed by the device, leaving a straight and neat adhesive strip in which the fiber is firmly embedded. The device has a coupling for attachment to the leading end of an adhesive syringe or a standard extension pole. Because fewer if any ladder moves are required, the time and cost to install an optical fiber at a user premises are significantly reduced.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the bounds of the following claims.

We claim:

1. A tool system for installing an optical fiber inside a user premises, comprising:
    a tool device including a neck and a head joined to a leading portion of the neck, wherein the head has a leading edge of a certain width for embedding a supplied optical fiber of given diameter into an adhesive bead that has been deposited along a structural corner at a user premises;
    a passageway formed on or within the head wherein the passageway is dimensioned and configured for guiding the fiber to a position ahead of the leading edge of the head;
    a slot formed in a wall of the passageway, wherein the slot is aligned in the direction of the passageway and is dimensioned so that the optical fiber is insertable sideways through the slot to enter the passageway;
    an adhesive dispensing gun system including a syringe having a nozzle for depositing the adhesive bead along the structural corner at the user premises;
    an attachment coupling joined to a trailing portion of the neck of the tool device, wherein the coupling is dimensioned and arranged to fit over a leading end of the syringe when using the tool device;
    the width of the leading edge of the head is determined so that when the edge is disposed transversely across the structural corner in which the adhesive bead has been deposited, and the optical fiber is inserted through the slot in the wall of the passageway on or within the head to enter the passageway to be guided ahead of the leading edge, the edge embeds the fiber in the adhesive bead when the edge is swept along the corner with the optical fiber disposed between the edge and the adhesive bead; and
    a fixture fastened to the tool device for mounting a fiber supply spool on which the optical fiber is wound, and the fixture is constructed and arranged so that the fiber is paid out from the spool in such a manner as to be guided through the passageway on or within the head of the tool device and become embedded in the adhesive bead when the tool system is in use.

2. A tool system according to claim 1, wherein the adhesive dispensing gun system includes an adhesive dispensing gun, and an extension tube constructed and arranged for mounting between the dispensing gun and the syringe.

3. A tool system according to claim 2, wherein the extension tube has a length L of approximately two feet.

4. A tool system according to claim 1, wherein the passageway on or within the head of the tool device comprises two spaced apart passageway sections in axial alignment with one another.

5. A tool system according to claim 1, wherein the head of the tool device extends in a plane that forms an angle of between 20 and 70 degrees with the vertical.

6. A tool system according to claim 1, wherein the head of the tool device extends in a plane that forms an angle of approximately 30 degrees with the vertical.

7. A tool system according to claim 1, wherein the passageway on or within the head of the device has a guide portion that tapers radially outward from an inlet of the passageway to facilitate receiving an end of the optical fiber, and to guide the fiber to enter the passageway.

8. A tool system according to claim 1, wherein the width of the leading edge on the head of the tool device is approximately 4.45 mm.

9. A tool device according to claim 1, wherein the width of the leading edge on the head of the tool device is approximately 6.0 mm.

* * * * *